Nov. 6, 1956
J. DOLZA ET AL
2,769,660
THERMOSTAT
Filed Sept. 15, 1951
4 Sheets-Sheet 4
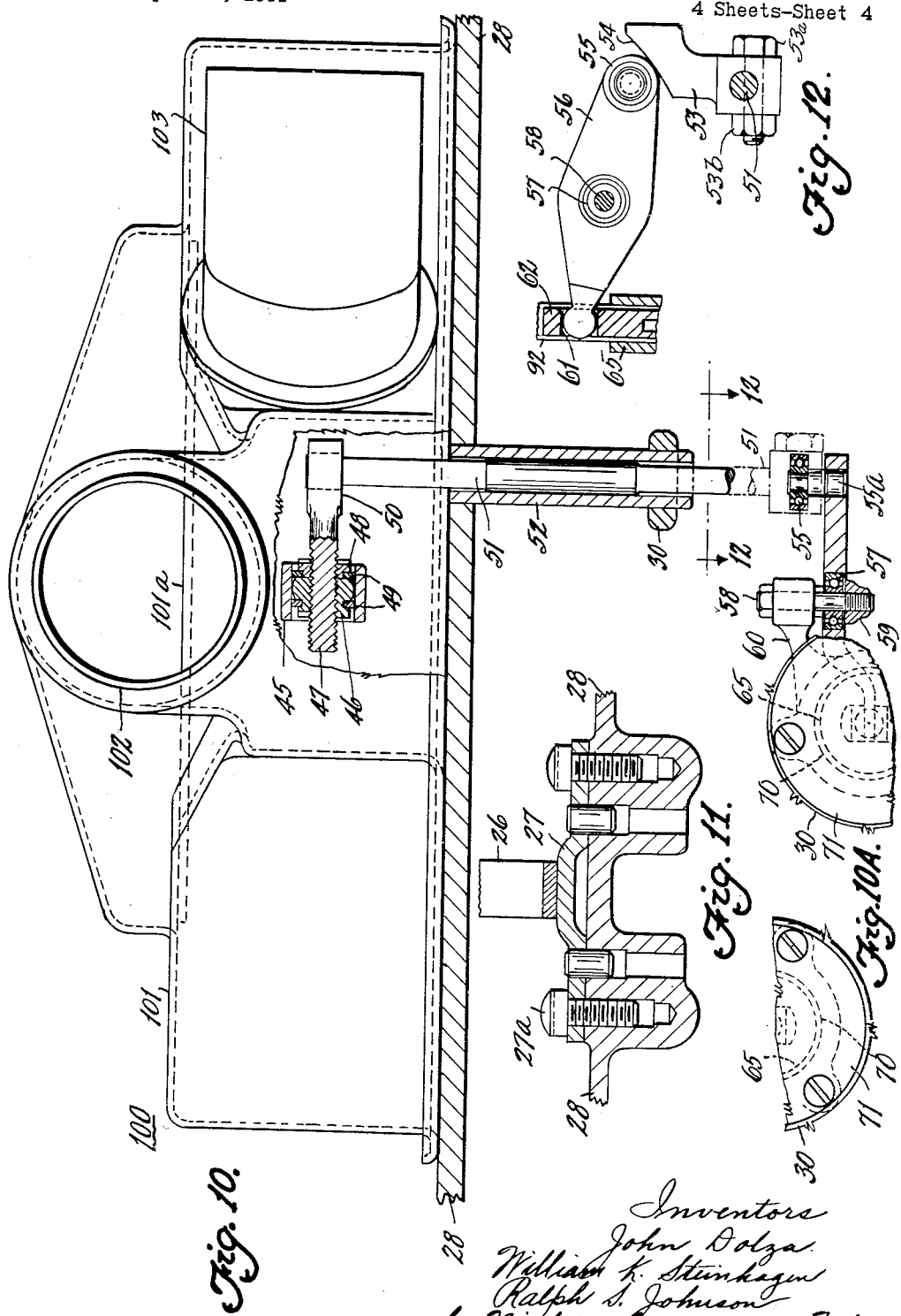
Inventors
John Dolza
William K. Steinhagen
Ralph S. Johnson
by Willits Hardman & Fehr
their attorneys

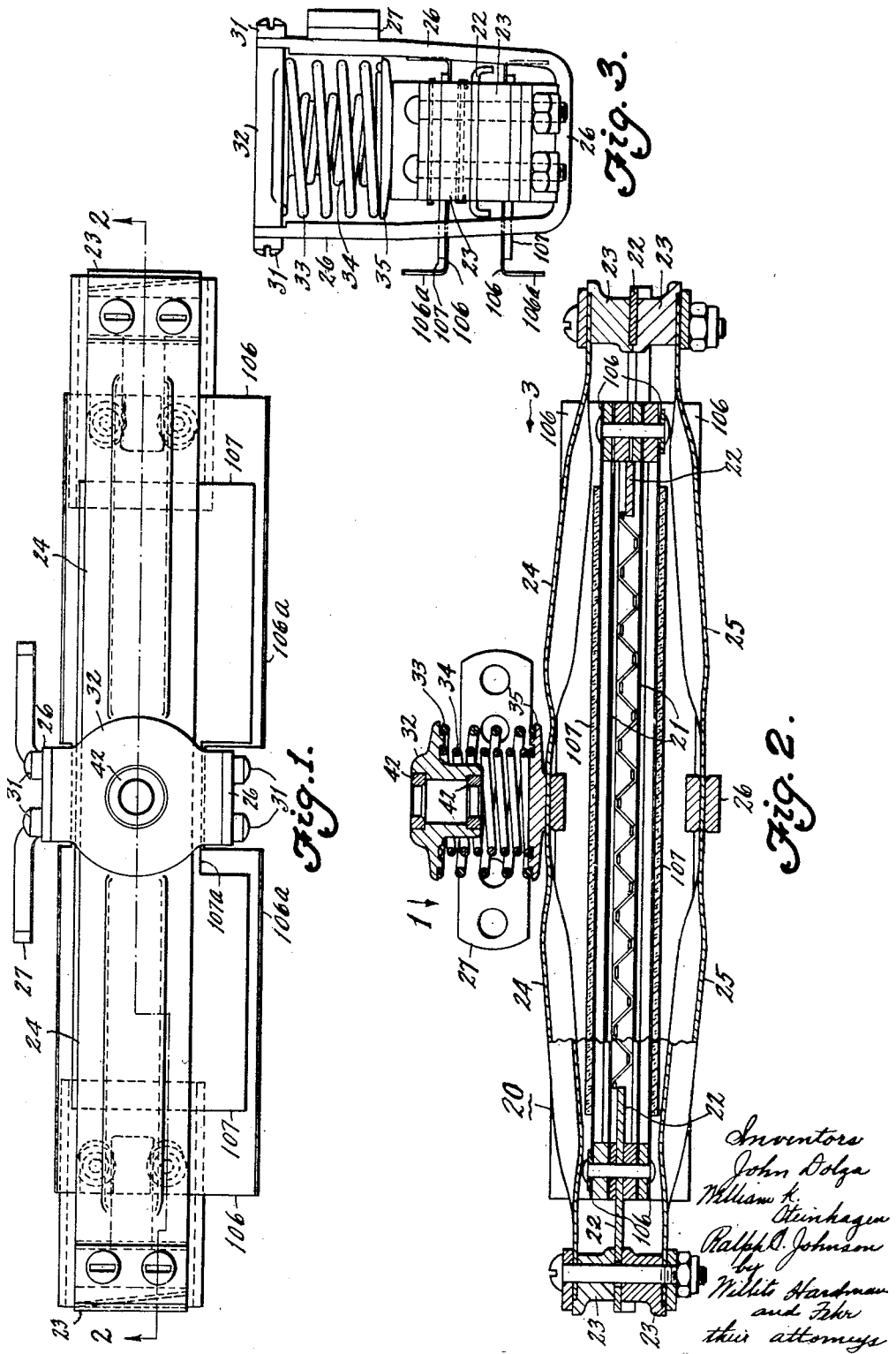

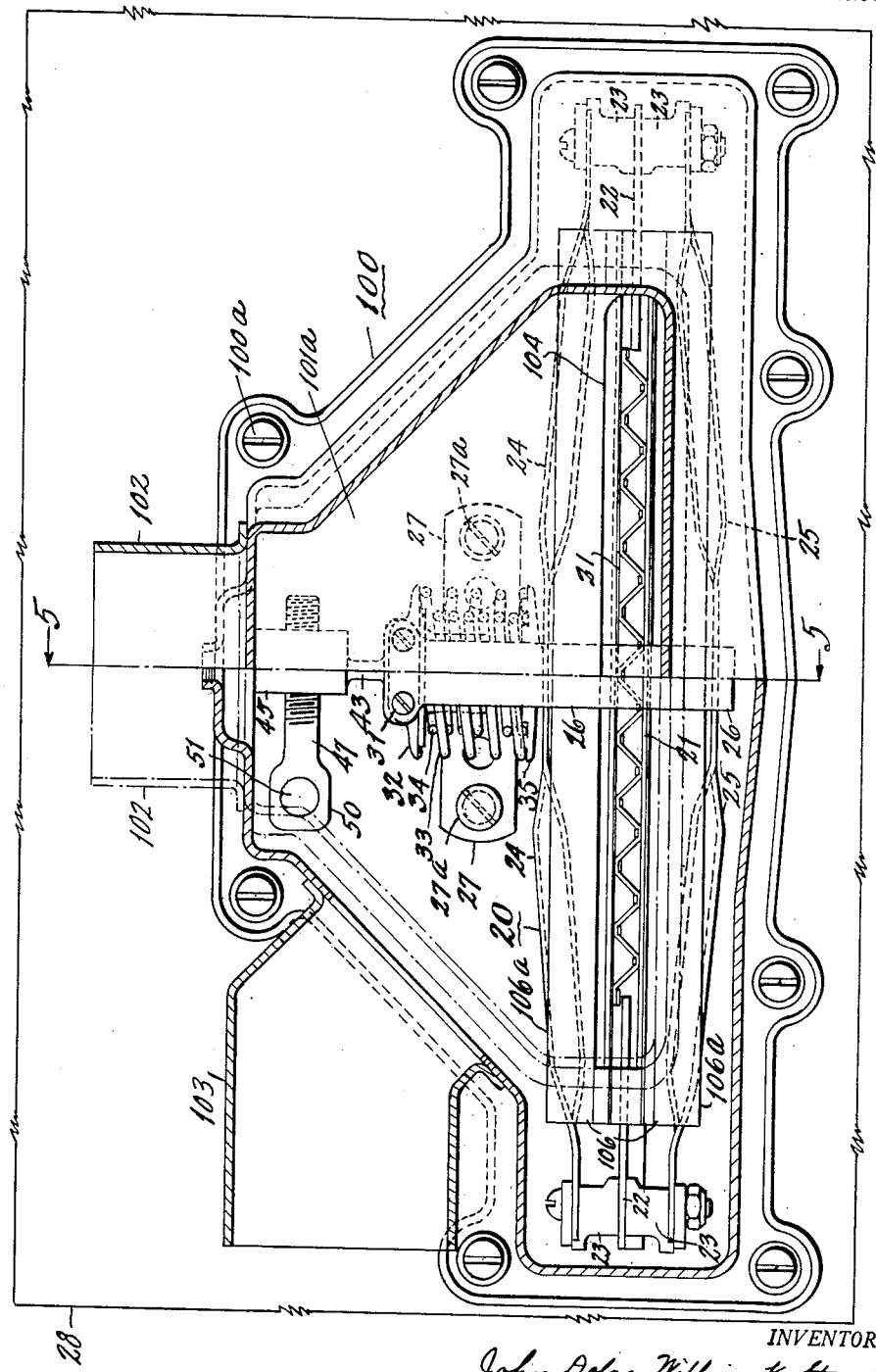

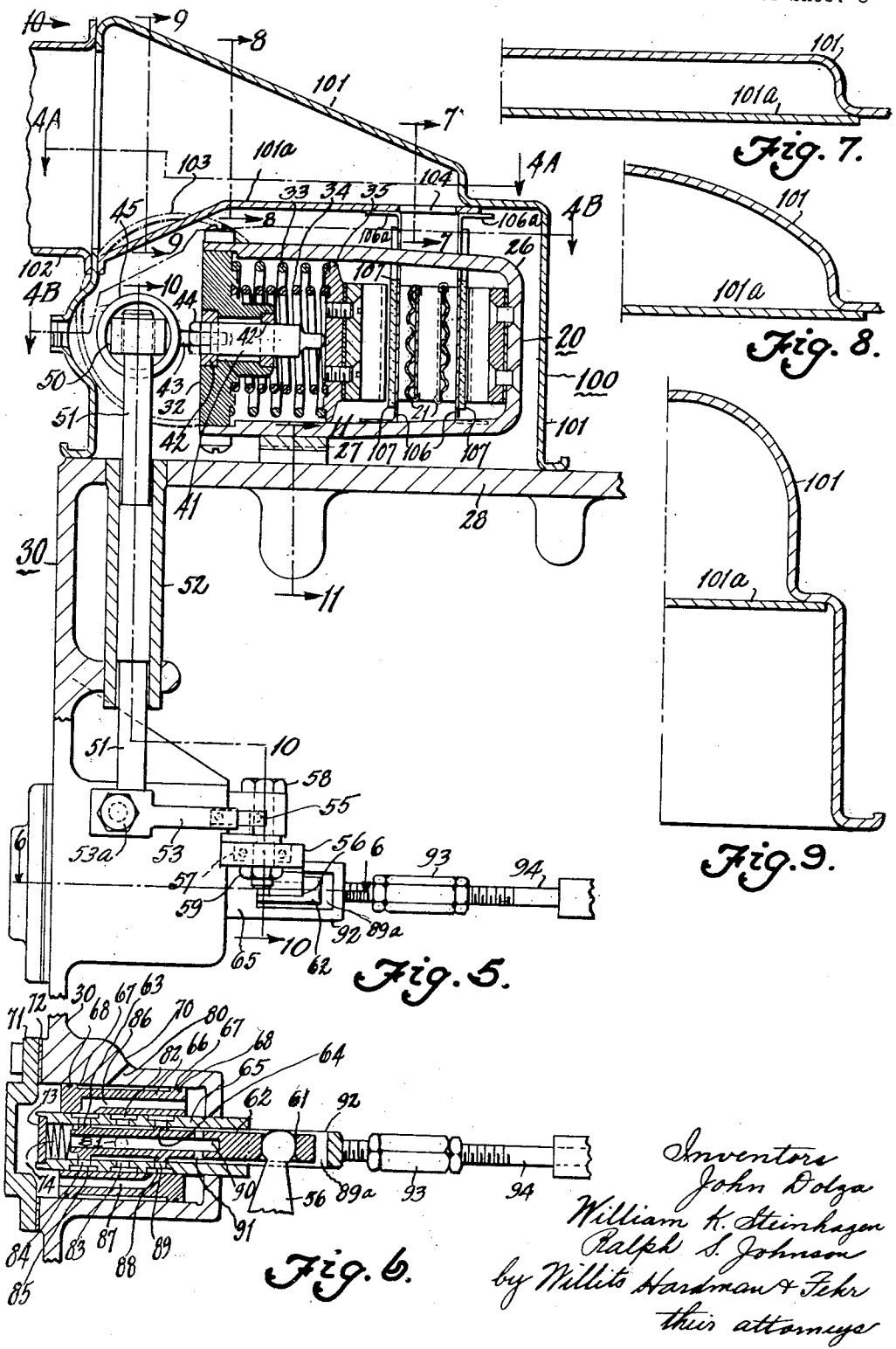

United States Patent Office

2,769,660
Patented Nov. 6, 1956

2,769,660
THERMOSTAT

John Dolza, Davisburg, and William K. Steinhagen, and Ralph S. Johnson, Royal Oak, Mich., assignors to General Motors Corporation, Detroit, Mich., a corporation of Delaware Application September 15, 1951, Serial No. 246,852

2 Claims. (Cl. 297—12)

This invention relates to temperature sensing apparatus for effecting a control in accordance with the temperature of a medium.

An object of the invention is to provide for the location of a temperature sensing thermostat for most effective influence by the medium and to provide for transmission of motion from the thermostat to an element of a device for exercising a control in response to the temperature of the medium.

In the disclosed embodiment of the invention, the temperature sensing thermostat is used to sense the temperature of air entering the compressor of an internal combustion turbine engine and the motion produced by the thermostat is transmitted to an element of an engine burner fuel controller. The thermostat is supported by a fuel controller housing which, in cooperation with a thermostat cover supported by the housing, provides a conduit which receives air from the compressor inlet, said cover directing the air to the thermostat and thence back to the compressor. The mechanism transmitting motion from the thermostat to an element of the controller in the housing is located partly within the cover and partly within the housing.

Further objects and advantages of the present invention will be apparent from the following description, reference being had to the accompanying drawings wherein a preferred embodiment of the present invention is clearly shown.

In the drawings:

Fig. 1 is a view of the thermostat in the direction of arrow 1 of Fig. 2.

Fig. 2 is a sectional view on line 2—2 of Fig. 1.

Fig. 3 is a view in the direction of arrow 3 of Fig. 2.

Fig. 4 is in part a sectional view on line 4A—4A of Fig. 5 and in part a sectional view on line 4B—4B of Fig. 5, and shows the thermostat and thermostat cover mounted upon a controller housing.

Fig. 5 is a sectional view on line 5—5 of Fig. 4.

Fig. 6 is a sectional view on line 6—6 of Fig. 5.

Figs. 7, 8 and 9 are, respectively, fragmentary sectional views on lines 7—7, 8—8 and 9—9 of Fig. 5.

Fig. 10 is a view, partly broken away, in the direction of arrow 10 of Fig. 5 and is partly in section on line 10—10—10 of Fig. 5.

Fig. 10A is a fragment omitted from Fig. 10.

Fig. 11 is a fragmentary sectional view on line 11—11 of Fig. 5.

Fig. 12 is a fragmentary sectional view on line 12—12 of Fig. 10.

A thermostat 20 (Figs. 1–3), which is the subject of the copending application of Dolza et al., Serial No. 190,086, filed October 4, 1950, now Patent No. 2,739,835, includes thin, parallel, corrugated strips 21 of metal having relatively high temperature coefficient of expansion, modulus of elasticity and tensile strength connected at their ends by thicker strips 22 and blocks 23 with two sheet metal arches 24 and 25. The arch 25 is attached to a stirrup 26 as shown in Fig. 5 attached to a bracket 27 attached as shown in Fig. 11 to a wall 28 of a housing 30. Screws 31 (Figs. 1 and 5) secure the ends of the stirrup 26 to a plate 32 which provides an abutment for two springs 33 and 34 which press against a plate 35 attached to the arch 24. The springs 33 and 34 maintain the strips 21 under tension. The arches 24 and 25 are made of metal having nearly zero temperature coefficient of expansion. The strips 22 are of such length and they are made of metal having such thermal coefficient that they provide compensators for change in length of the arches 24 and 25 due to temperature change. Therefore the movable central portion of arch 24 will be displaced with respect to the fixed central portion of arch 25 by an amount which is proportional only to change in length of the strips 21 due to temperature change.

The movement of the central portion of arch 24 is transmitted through plate 35 (Fig. 5) to a rod 41 slidable in bearings 42 provided by plate 32. Rod 41 threadedly receives a screw 43 retained in adjusted position by a nut 44. Screw 43 extends from a tube 45 which, as shown in Fig. 10, receives a nut 46 having a spherical outer surface engaging the cylindrical inner surface of tube 45. Nut 46 is adjustable along a screw 47 and is retained in adjusted position on the screw by a nut 48. Nuts 46 and 48 carry felt washers 49 for excluding dirt from the engaging surfaces of nut 46 and tube 45.

Screw 47 is provided by a lever 50 attached to a shaft 51 journalled in a bearing bushing 52 (Fig. 5) supported by housing 30 and connected by screw 53a and nut 53b with a lever 53 (Fig. 12) which provides a cam surface 54 engaged by a roller 55 carried by a lever 56 urged clockwise (Fig. 12) by a spring to be described about its ball bearing pivot 57 supported by a bolt 58 and a nut 59 (Fig. 10) supported by a fixed bracket 60. As shown in Fig. 10, roller 55 is provided by the outer race of a ball bearing, the inner race of which is attached to a stud 55a attached to lever 56.

One end of lever 56 is received by a notch 61 in a valve rod 62 having lands 63 and 64 (Fig. 6) fitting closely within a tubular piston rod 65 attached to a piston 66 having flanges 67 carrying rings 68 closely fitting a cylinder 70 provided by the housing 30 and providing the bracket 60 (Fig. 10). The cylinder 70 is closed by a cap 71 sealed by a gasket 72. Between a plug 73 at the left end of piston rod 65 and the valve rod 62, there is located a spring 74 which urges rod 62 to the right in Fig. 6 or up in Fig. 12 so that roller 55 is urged against cam 54. Consequently, rod 41 (Fig. 5) is urged against plate 35 of the thermostat.

Fig. 6 shows the relation of piston rod 65 and valve rod 62 in equilibrium status. Pressure fluid is admitted to the space surrounding rod 62 and between its lands 63 and 64 from a source (not shown) which is connected with hole 80 in cylinder 70 leading to the space between piston flanges 67, through holes 81 in the piston (one shown in Fig. 6) to an annular groove 82 and holes 83 in piston rod 65 to the space between lands 63 and 64 of valve rod 62.

Change in the temperature of the medium surrounding the thermostat strips 21 will cause rotation of cam lever 53 and displacement of rod 62 relative to rod 65. If rod 62 moves left, holes 83 of rod 65 are connected with holes 84 and grooves 85 of rod 65 and pressure fluid flows through holes 86 (one shown in Fig. 6) to the right side of piston 66 which causes piston 66 to move left until holes 84 are blocked by land 63. During this movement, fluid at the left of piston 66 escapes through holes 87 in the piston, groove 88 and holes 89 of rod 65 to the interior of rod 65 and out through opening 89a to a sump in housing 30.

If rod 62 moves right, holes 89 of rod 65 are connected with holes 83 and pressure fluid flows through holes 87 of piston 66 to the left side of the piston to cause it to move right until holes 89 are blocked by land 64. During this movement, fluid at the right of piston 66 escapes through holes 86, groove 85, holes 84, central hole 90 and side holes 91 of rod 62 to the interior of rod 65 and thence through opening 89a to the sump.

Thus rod 65 follows rod 62 and has the same displacement. Motion of rod 65 is transmitted through a yoke 92 of rod 65 (yoke 92 surrounds opening 89a) and a turnbuckle to a member 94 which is part of a controller having, as one of its functions, the control of burner fuel flow in accordance with compressor inlet temperature. Cam 54 (Fig. 12) is contoured so that member 94 is positioned according to a desired function of compressor inlet absolute temperature, for example, a logarithm of compressor inlet temperature in Rankin degrees.

Referring to Figs. 4 and 5, the thermostat 20 is enclosed by a cover 100 made of sheet metal parts, namely, a body 101, a partition 101a, a neck 102 to be connected with a pipe which directs air to the compressor inlet and a neck 103 to be connected with the compressor inlet. Air enter the cover 100 through neck 102 and passes above (in Fig. 5) the partition 101a, through a long slot 104 in the partition and down between the thermostat strips 21. The chamber 105, provided by the cover body 101 and the wall 28 of housing 30 receives this air and directs it to the neck 103; and thence the air passes to the compressor inlet. The strips 21 support deflector plates 106, notched to receive the stirrup 26 (Fig. 5) and having flanges 106a close to the partition 104, whose function is to direct most of the air moving through the slot 104 between the strips 21 so that the strips will be more sensitive to changes in compressor inlet air temperature. Strips 107 of heat insulating material are mounted on plates 106 to increase their stiffness.

The cover 100 together with housing 30, which supports the cover and the thermostat enclosed by the cover, provide for the conduction of air from the compressor air inlet duct to the compressor inlet. The housing 30 together with the mechanism which transmits motion from the thermostat 20 to a member of fuel controller to be located within housing 30 provide a sub-assembly unit. The thermostat 20 is another sub-assembly unit which is placed upon housing wall 28 and is located so that the bearings 42 provided by plate 32 will receive rod 41. When the thermostat is in the position shown in Fig. 5, its stirrup bracket 27 is fastened to housing wall 28 by screws 27a (Fig. 11). The cover 100, which is the third sub-assembly, is placed around the thermostat and attached to wall 28 by screws 100a (Fig. 4).

While the embodiment of the present invention as herein disclosed, constitutes a preferred form, it is to be understood that other forms might be adapted.

What is claimed is as follows:

1. Apparatus for sensing the temperature of a gaseous medium comprising a thermostat including spaced, parallel strips of metal having relatively high temperature coefficient of expansion, and said strips being movable in response to variations in temperature of the gaseous medium, plates parallel to the strips and spaced therefrom, a moveable member and means for causing movement of the member in accordance with changes in length of the strips, a housing enclosing the thermostat having a chamber into which the gaseous medium is introduced and a second chamber through which the gaseous medium flows after passing the thermostat, a partition separating said chambers and supporting said plates, said partition having an opening communicating with the space between said plates in which the thermostatic strips are positioned, a conduit supplying the gaseous medium to said first chamber so that said medium can flow into the space between said plates and into the second chamber, a conduit for conducting the gaseous medium away from said second chamber after it has passed between said plates, and a motion transmitting mechanism operatively connected with the movable member.

2. Apparatus for sensing the temperature of a gaseous medium and for transmitting a movement to a control device, said apparatus comprising three sub-assemblies, namely, a sub-assembly of a housing for the control device together with a mechanism for transmitting motion from a thermostat to an element of the control device, a thermostat including strips of metal having relatively high temperature coefficient of expansion, said strips being movable in response to variations in temperature of the gaseous medium, a movable member and means for causing movement of the member in accordance with change in length of the strips, and a cover for enclosing the thermostat; means for securing the thermostat to the housing in a location such that said member is operatively connected with the mechanism of the first-mentioned sub-assembly, means for attaching the cover to the housing, said cover having a partition dividing the interior of the housing into two chambers, one of which encloses the thermostat and is closed by the housing, an inlet for a gaseous medium into the other chamber, an outlet for the medium from the thermostat enclosing chamber, and means for causing flow of the medium in proximity to the thermostat strips, said means including an opening in the partition and members provided by the thermostat for confining the flow of the medium which passes through the opening to the vicinity of the thermostat strips.

References Cited in the file of this patent

UNITED STATES PATENTS

| | | |
|---|---|---|
| Re. 7,702 | Brown | May 29, 1877 |
| 1,419,246 | Gee | June 13, 1922 |
| 1,550,410 | Wunsch | Aug. 18, 1925 |
| 1,857,025 | Hurxthal | May 3, 1932 |
| 1,918,985 | Robson | July 18, 1933 |
| 1,972,852 | Albright | Sept. 11, 1934 |
| 2,020,847 | Mitereff | Nov. 12, 1935 |
| 2,111,659 | Benedek | Mar. 22, 1938 |
| 2,193,142 | Price | Mar. 12, 1940 |
| 2,259,061 | Caffier | Oct. 14, 1941 |
| 2,261,750 | Bahnson | Nov. 4, 1941 |
| 2,280,190 | Ernst | Apr. 21, 1942 |
| 2,283,138 | Hagemann | May 12, 1942 |
| 2,287,177 | Joesting | June 23, 1942 |
| 2,528,901 | Morse | Nov. 7, 1950 |